United States Patent [19]

Ifune

[11] Patent Number: 5,093,800

[45] Date of Patent: Mar. 3, 1992

[54] GLOBAL POSITIONING SYSTEM SATELLITE SIGNAL SIMULATOR

[76] Inventor: Saburo Ifune, 675 Bonwit Pl., Simi Valley, Calif. 93065

[21] Appl. No.: 407,215

[22] Filed: Sep. 14, 1989

[51] Int. Cl.⁵ ............................................. G06G 7/78
[52] U.S. Cl. .................................................... 364/578
[58] Field of Search .................... 342/356, 357, 352; 364/578

[56] References Cited

U.S. PATENT DOCUMENTS 4,701,934 10/1987 Jasper .................................. 364/576
4,910,525 3/1990 Stulken ................................ 342/356

FOREIGN PATENT DOCUMENTS 0276931 11/1988 Japan ................................. 342/352

Primary Examiner—Parshotam S. Lall
Assistant Examiner—Michael Zanelli
Attorney, Agent, or Firm—Elliott N. Kramsky

[57] ABSTRACT

A test transmitter apparatus has been designed for testing global positioning system (GPS) receivers. This test transmitter apparatus has the ability to generate a radio frequency (RF) output which simulates GPS satellite signals. Generally, the RF test signal is generated as follows: A digital test signal is produced by a signal generator which is driven by specific programs run on a suitably adapted computer. The digital signal is then converted to a RF signal by a numerical control oscillator and an analog converter.

10 Claims, 3 Drawing Sheets

GLOBAL POSITIONING SYSTEM SATELLITE SIGNAL SIMULATOR

BACKGROUND OF INVENTION

This invention relates to electromagnetic wave transmitters, and more particularly, to a transmitter for producing an output signal which simulates an orbiting GPS (Gobal Positioning System) satellite.

The present invention will have many application and should, therefore, not be limited to those disclosed herein and in the drawings. However, the invention has been found to be especially useful when employed in connection with a test transmitter for GPS receivers.

In the past, test transmitters for GPS receivers have been employed to provide data and equivalent doppler frequency for GPS receivers. Test transmitters for GPS receivers have been used as a method to reduce the cost associated with field tests. Unfortunately, such systems have been relatively complicated, and thus too expensive for practical commercial purposes.

Accordingly, it is a principle object of the present invention to provide a relatively low cost GPS test transmitter while retaining high performance capability.

SUMMARY OF INVENTION

Briefly, the present invention provides a new and improved apparatus for testing GPS receivers by simulating the signal and the equivalent doppler frequency of an orbiting satellite. The test transmitter apparatus includes a computer which contains all the simulated mission maneuvers and orbit parameters of the satellites, a monitor for indicating the parameters of the apparatus, a keyboard for manual operation of the apparatus, and a signal generator that receives and decodes the information from the computer to emulate the appropriate satellites.

In its present state, the invention employs from one to eight channels to accommodate simulated tracking of one to eight GPS satellites at any given time. Standard satellite tracking methods utilizes at least four GPS satellites to determine position in three dimensional space. The invention herein may be adapted for one to eight channel use without redesign or extensive modification, where a single channel represents the signal sent from one satellite.

The present invention includes several new and improved features permitting a test transmitter of reduce complexity and cost. By way of example, a primary feature of this device resides in an unique numerical control oscillator designed to convert computer data from digital to analog form. As will be explained hereinafter, a feature of this numerical control oscillator is a divide circuit to decrease the phase jitter from a digital signal. Once the phase jitter is reduced in the numerical control oscillator circuit, the resulting output is changed to an intermediate frequency (IF) in an up converter.

Another unique feature resides in the frequency plan of the overall test transmitter system. Moreover, by dividing the carrier frequency, in a presettable counter, and employing an up converter, the code frequency can be obtained. This enables the test transmitter to use only one numerical control oscillator per channel for both the carrier and code frequency. Furthermore, a single external computer provides each and every channel with the appropriate doppler shift and data.

Other and further objects, advantages and features of the present invention will be understood by reference to the following specification in conjunction with the annexed drawings.

DESCRIPTION OF THE PREFERRED EMBODIMENT

Considering now a preferred embodiment of the present invention as illustrated in the accompanying drawings, it is noted that a GPS satellite employed for navigational purposes continuously transmits data at a frequency of 1575.42 MHz., and inasmuch as the satellite is orbiting the earth, a receiver aboard a ship, for example, will receive this transmission at the above-noted frequencies plus or minus 5 KHz., owing to Doppler Shift. The foregoing is well known and is necessarily employed in the present invention to emulate a GPS satellite.

Figure 1:
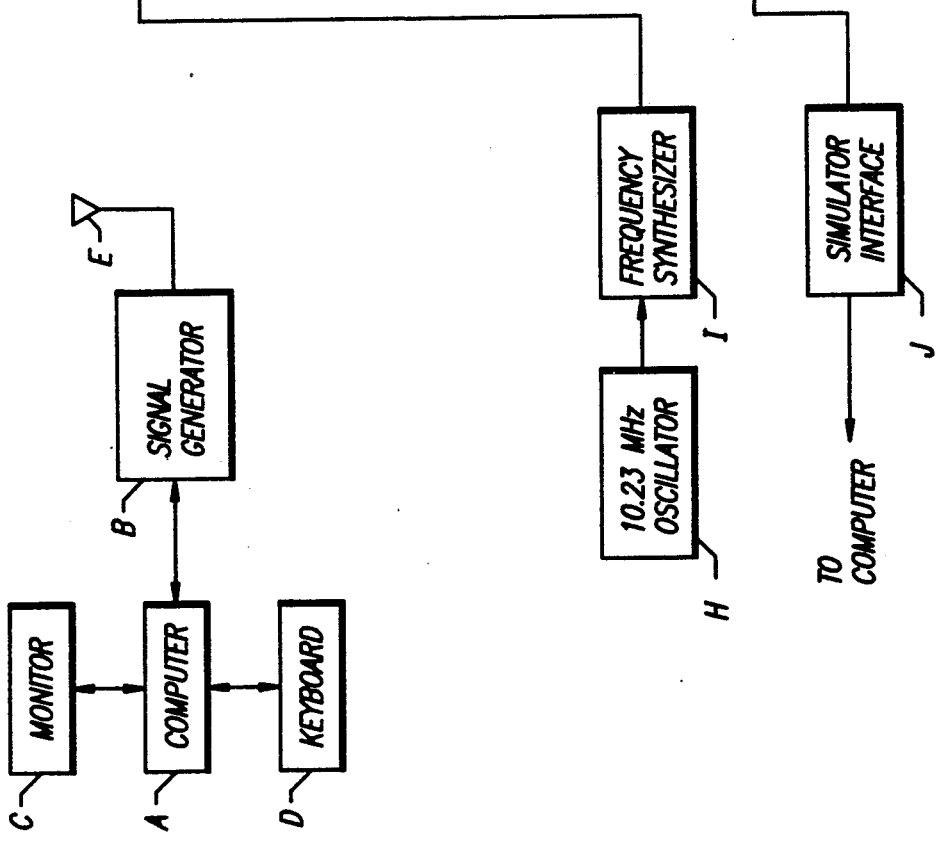
FIG. 1 is a block diagram of the apparatus of the present invention.

As shown in FIG. 1, output source E is connected to signal generator B for transmitting an artificial GPS satellite signal. Signal generator B receives control information, the content to be explained hereinafter, from computer A via a standard IEEE 488 interface buss. Digital information, comprising of ephemeral and almanac data, sent by computer A is modified in signal generator B into an analog signal. The said analog signal, in a manner to be set forth below, can be used to test GPS receivers in a dynamic or stationary trajectory. Display C receives data from computer A and forms an output indication of the signal generator status. Keyboard D permits an operator of the test transmitter to manually adjust the parameters of the test field through display C.

Figure 2:
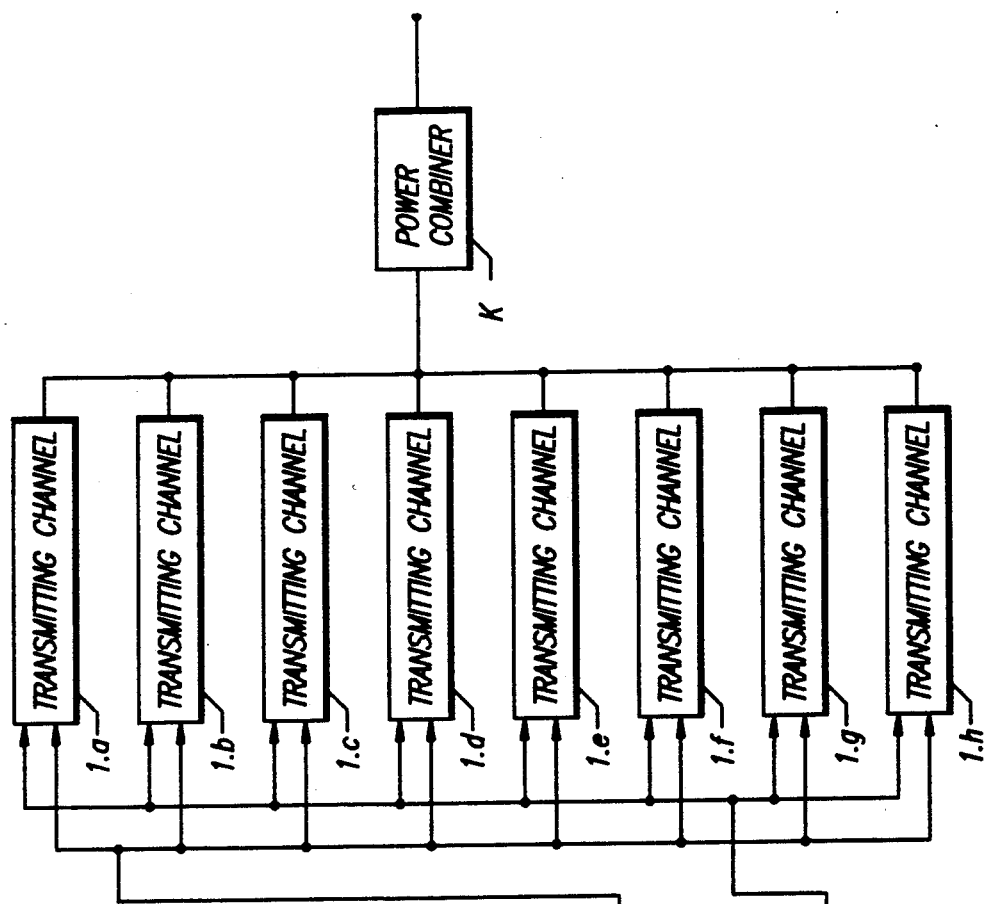
FIG. 2 is a block diagram of the signal generator portion of the present invention.

Referring to FIG. 2, an extremely stable and low noise reference oscillator H (also in the block diagram of FIG. 3) tuned to a frequency of 10.23 MHz, is connected to frequency synthesizer I. Frequency synthesizer I comprises of a 1462.87 MHz voltage controlled oscillator that is phase locked to oscillator H. The output of frequency synthesizer I comprises of the following analog continuous wave reference frequencies: 1462.89 MHz, 112.40821 MHz, 9.499285 MHz, and 10.23 MHz, utilized for mixing by each and every transmitting channel 1.$a$ through 1.$h$. Digital data from the computer, as mentioned above, is decoded through simulator interface J and is received by each said transmitting channel. From each and every transmitting channel a L-band signal with clear access code modulation, data modulation, and doppler shift is sent to power combiner K. L-band signals from each transmitting channel is summed by power combiner K into one output. Output of power combiner K may be utilized by a GPS receiver.

Figure 3:
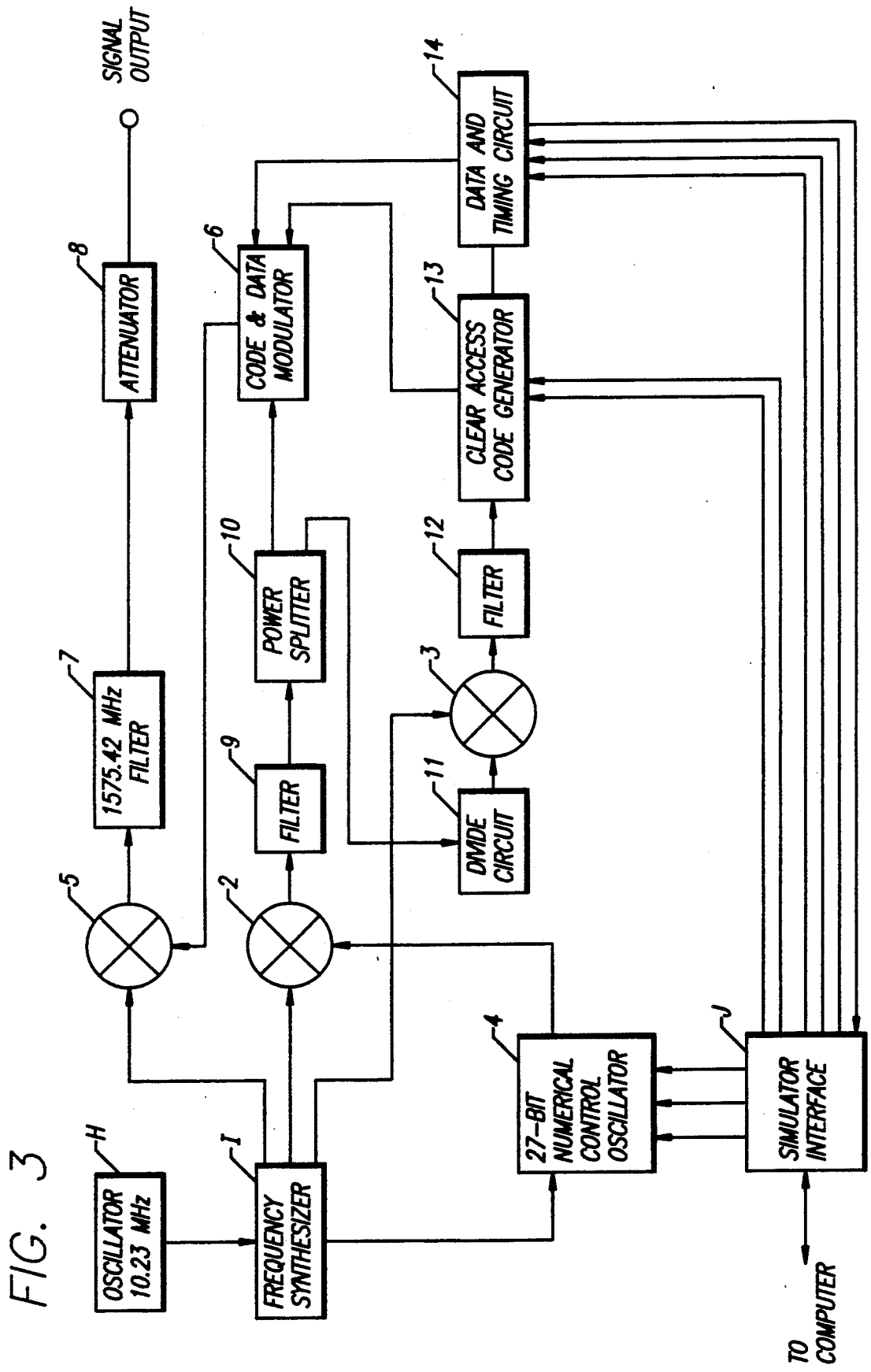
FIG. 3 is a block diagram of a single channel portion of the signal generator of the present invention.

Referring to FIG. 3, in each and every channel, three reference frequencies from frequency synthesizer I with frequencies comprising of 112.40821 MHz, 1462.87 MHz, and 9.499285 MHz, function as input to mixers 2, 5, and 3, respectively. The 10.23 MHz reference signal from frequency synthesizer I is identical to that emerging from oscillator H and serves as input for Numerical Control Oscillator (NCO) 4.

The L-band signal of 1462.89 MHz from frequency synthesizer I is up converted in mixer 5 with the IF frequency, explained in greater detail below, from code and data modulator 6. The output of mixer 5 is passed through filter 7 which is tuned to a frequency of 1575.42 MHz. 5-bit attenuator 8 with a range of 0–31 db receives input from filter 7 and varies the power level of the 1575.42 MHz signal. This signal provides input for power combiner K.

The present invention employs computer A to provide a 8-bit information signal, loaded three times every two milliseconds through simulator interface J, to a 27-bit numerical control oscillator 4. Frequency synthesizer I provides a 10.23 MHz clock signal to NCO 4 to insure an accurate data interrupt rate. Since 24-bits of information are passed every two milliseconds, 3-bits of the 27-bit NCO 4 are set internally. The output of NCO 4 is a 121.7856 kilohertz signal, plus or minus the doppler shift. This 121.7856 KHz signal is up converted by mixer 2 with a 112.40821 MHz reference signal from frequency synthesizer I. Filter 9 tuned to 112.53 MHz receives the output from mixer 2 and provides a signal for power splitter 10. Of the two signals emerging from power splitter 10, a 112.53 MHz signal is received by code and data modulator 6 as a carrier frequency. Code frequency and data are modulated upon the said carrier frequency by code and data modulator 6 and is input for mixer 5. The other 112.53 MHz signal from power splitter 10 is received by frequency divide circuit 11 and is divided by 154. A signal with a frequency of 730.7 KHz is obtained from frequency divide circuit 11 and is up converted to 10.23 MHz by mixer 3 and a reference frequency 9.499285 MHz from frequency synthesizer I. Filter 12 is tuned to 10.23 MHz and receives input from mixer 3. Filter 12 furnishes a signal for clear access code generator 13. Clear access code generator 13 is a random noise generator that mimics the pseudo-random noise chip stream unique to each GPS satellite. This clear/access code is a code of 1023 bits or 1 millisecond duration at a 1.023 megabyte per second bit rate. The clear/access code has 1023 different offsets and hence has 1023 different codes of this form. Furthermore, the 10.23 MHz frequency from filter 12 is divided by 10 within clear access code generator 13 to provided it with a timing frequency.

Of the two signals emerging from clear access code generator 13, a code signal rate of 1.023 MHz furnishes code modulator 6 with input. The second output of clear access code generator 13 provides a 1 millisecond input pulse for data timing circuit 14. Data and timing circuit 14 receives additional information from simulator interface J that comprises of data load and set-up information. The 1 millisecond pulse from clear access code generator 13 is divided by 20 in data and timing circuit 14, and results in a 20 millisecond data rate. The 20 millisecond data rate is the speed at which the system request additional data from computer A. Accordingly, an interrupt occurs every 20 millisecond within data and timing circuit 14 to request another bit of data from computer A through simulator interface J. This data (comprising of ephemeral and almanac information) is input for code modulator 6.

As noted above, the present invention includes or at least cooperates with computer A, shown in the block diagram of FIG. 1. Various operations are performed in computer A in common with conventional GPS satellite navigational systems and conventional programming is also incorporated therein.

In the preferred embodiment of the present invention, computer A utilizes the following equipment:
  386 IBM-compatible computer with at least 2 megabyte of memory;
  287 Co-processor;
  100 Mega-byte hard disk;
  20 MHz clock;
  Keyboard;
  and monitor.

NUMERICAL CONTROL OSCILLATOR

Figure 4:
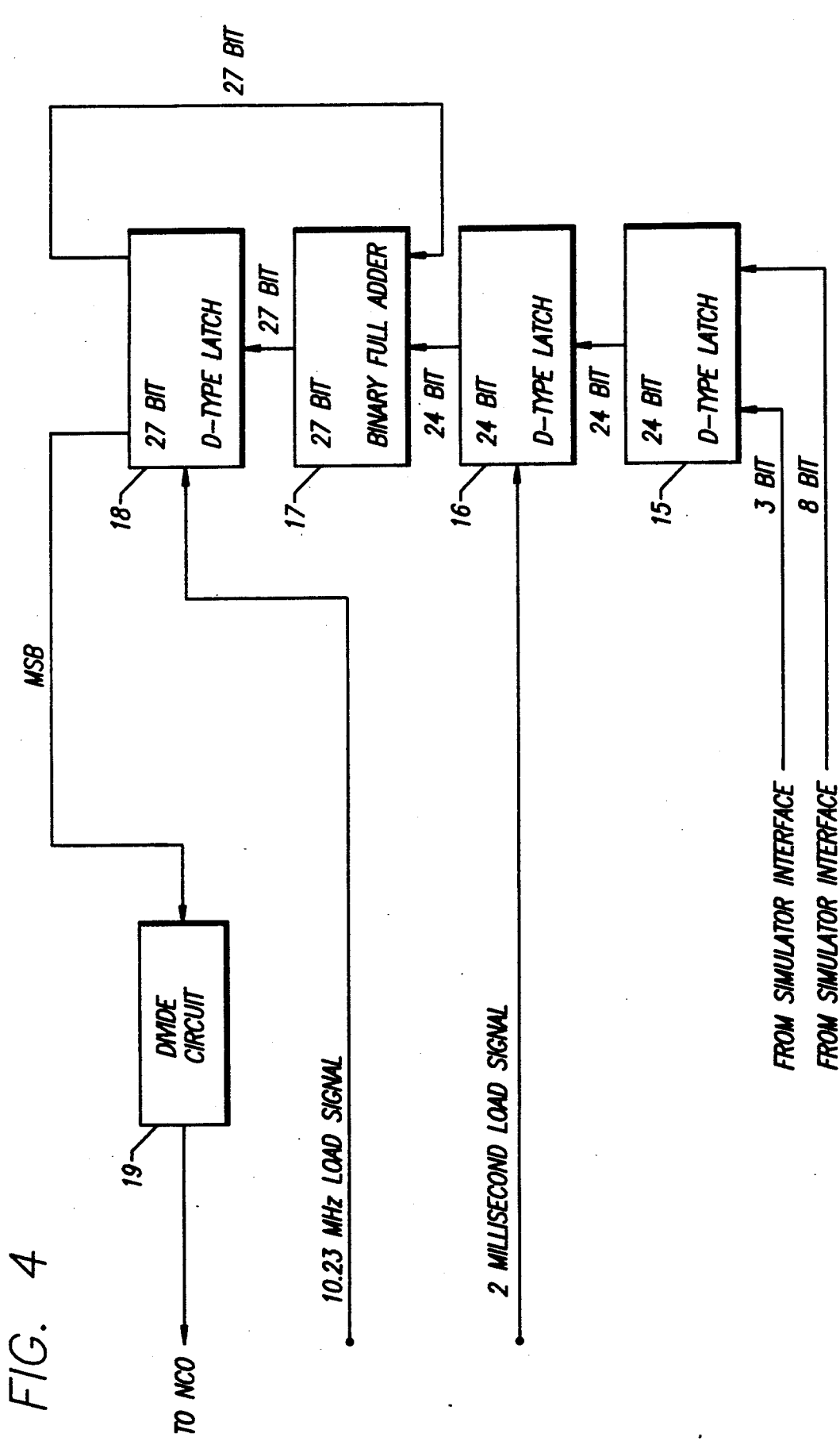
FIG. 4 is a block diagram of a numerical control oscillator portion of the present invention.

In the present invention each channel (1.$a$–1.$h$) receives a total of 24 bits of data from computer A within a 2 millisecond period. In FIG. 4, 24 bit D-type latch 15 receives a 8 bit load signal three times per 2 milliseconds. The 24 bit word output of D-type latch 15 is received by 24 bit D-type latch 16 once every 2 milliseconds. This 24 bit word is passed to 27 bit binary full adder circuit 17. 27 bit binary full adder circuit 17 adds this word to the 27 bit word from D-type latch 18. The output of 27 bit Binary full adder circuit 17 is passed to 27 bit D-type latch 18. Of the two outputs emerging from 27-bit D-type latch 18, one, as mentioned above, is sent to 27 bit binary full adder circuit 17, the other output is sent to divide circuit 19. The output from 27 bit D-type latch 18 is in the most significant bit (MSB) format at a frequency of 1.9485 MHz. However, the 1.9485 MHz output contains a phase jitter of 1/10.23 MHz. Therefore, to reduce the phase jitter, the output of 27 bit D-type latch 18 is sent to divide circuit 19, wherein it is divided by 16 to reduce the phase jitter by a ratio of 16 to 1. The output of divide circuit 19 is sent to up converter 2, in the block diagram of FIG. 3.

OPERATION

In the operation of the embodiment of the invention shown in the block diagram of FIGS. 1, 2, 3, and 4, a number of initial conditions must be set. From pre-stored scenarios or user provided scenarios, computer A provides, through simulator interface J, each and every channel of the present invention with the appropriate initial conditions:
  Numerical control oscillator 4 receives 24-bit information to determine initial doppler frequency;
  Clear access code generator 13 receives the appropriate pseudo-random noise chip stream unique to each satellite;
  Clear access code generator 13 is set to the appropriate chip within the 1023 chip stream of the clear/access code;
  Data and timing circuit 14 receives the first data bit;
  and attenuator 8 receives the initial power level setting.

Once these initial conditions are set, NCO 4 receives a 2 millisecond signal from simulator interface J. Simulator interface J also sends computer A a similar signal every 2 milliseconds. Also, the status of the navigational conditions are displayed by monitor C, as provided by computer A. From computer A, through simulator interface J, each and every NCO 4 receives three 8-bit words within a 2 millisecond period. The initial 121.7856 MHz carrier frequency emerging from NCO 4 is consequently modified according to the 24-bit information (three 8-bit words). The resulting carrier frequency is input for mixer 2 and then sent to code and data modulator 6 through power splitter 10 and filter 9. Meanwhile, data and timing circuit 14 receives from computer A, through simulator interface J, a data signal every 20 milliseconds. The output of data and timing circuit 14, combined with the signal from power splitter 10, forms the IF signal emerging from code and data modulator 6. This IF signal is then sent to attenuator 8 through mixer 5 and filter 7. The output of attenuator 8 is an analog signal that may be used by a GPS receiver.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

What is claimed is:

1. A method for generating a test signal that simulates GPS satellite transmissions comprising the steps of:
   a) generating a digital signal comprising predetermined ephermeral and almanac data;
   b) generating a 10.23 MHz analog reference signal; and
   c) generating a 1462.89 MHz analog signal; and
   d) generating a 112.40821 MHz analog signal; and
   e) generating a 9.499285 MHz analog signal; then
   f) decoding said digital signal; then
   g) applying said analog signals and said decoded signal to at least one transmitting channel; then
   h) combining each of said signals of step g) in each of said transmitting channels to produce at least one L-band signal with clear access code modulation, data modulation and doppler shift; and then
   i) combining the outputs of each of said transmitting channels to produce said test signal.

2. A method as defined in claim 1 wherein step h) further includes the steps of:
   a) modulating said reference signal with said decoded signal to produce a 121.7856 kHz±doppler shift signal; then
   b) upconverting said 112.40821 MHz signal with said 121.7856 MHz±doppler shift signal to produce a 112.53 MHz±doppler signal; then
   c) dividing said 112.53 MHz signal to a 730.7 KHz signal; then
   d) upconverting said 730.7 KHz signal with said 9.499285 MHz signal to produce a 10.23 MHz signal; then
   e) dividing said 10.23 MHz signal to provide a 1.023 MHz signal; then
   f) clocking a code generator with said 1.023 MHz signal to select one of 37 pseudorandom codes; then
   g) clocking said ephemeral and almanac data with a 1 ms pulse to provide ephemeral and almanac data at 50 Hz; then
   h) modulating said 112.53 MHz carrier with said 50 Hz ephemeral and almanac data and said clocked pseudorandom codes to produce a modulated 112.53 MHz carrier; and then
   i) upconverting said modulated carrier with said 1462.89 MHz signal to produce an L-band signal with clear access modulation.

3. A method as defined in claim 2 comprising the additional steps of:

a) applying said upconverted 112.53 MHz±doppler signal to a 112.53 MHz filter; and
   b) applying said upconverted 10.23 MHz signal to a 10.23 MHz filter; and
   c) applying upconverted L-band signal to a 1575.42 MHz filter.

4. A method as defined in claim 3 comprising the additional step of adjusting the power of said L-band signal.

5. Apparatus for generating a test signal that simulates GPS satellite transmissions comprising, in combination:
   a) means for generating a digital signal comprising predetermined ephemeral and almanac data;
   b) means for generating a 10.23 MHz analog reference signal, a 1462.89 MHz analog signal, a 112.40821 MHz analog signal and a 9.499285 MHz analog signal;
   c) means for decoding said digital signal to an 8 bit format;
   d) at least one transmitting channel, each channel being arranged to combine said signals to produce an L-band signal with clear access code modulation, data modulation and doppler shift; and
   e) means for combining the outputs of said transmitting channels to produce said test signal.

6. Apparatus as defined in claim 5 wherein each of said at least one transmitting channels further includes:
   a) means for modulating said reference signal with said decoded signal to produce a 121.7856 kHz±doppler shift signal;
   b) means for upconverting said 112.40821 MHz signal with said 121.7856 kHz±doppler shift signal to produce a 112.53 MHz±doppler shift signal;
   c) means for dividing said 112.53 MHz signal to a 730.7 KHz signal;
   d) means for upconverting said 730.7 KHz signal with said 9.499285 MHz signal to produce a 10.23 MHz signal;
   e) means for clocking said ephemeral and almanac data with said 10.23 MHz signal;
   f) means for modulating said 112.53 MHz signal with said clocked ephemeral and almanac data to produce a 112.53 MHz modulated carrier; and
   g) means for upconverting said modulated carrier with said 1462.89 MHz signal to produce an L-band signal with clear access modulation.

7. Apparatus as defined in claim 6 further including:
   a) a 112.53 MHz filter for processing said upconverted 112.53 MHz±doppler signal;
   b) a 10.23 MHz filter for processing said upconverted 10.23 MHz signal; and
   c) a 1575.42 filter for processing said upconverted L-band signal.

8. Apparatus as defined in claim 7 further including means for adjusting the power of said L-band signal.

9. Apparatus as defined in claim 8 further including means for manually inputting said ephemeral and almanac data.

10. Apparatus as defined in claim 6 wherein said means for modulating said reference signal with said decoded signal further includes:
   a) a first 24 bit latch for receiving 8 bit decoded signals three times per 2 milliseconds;
   b) a second 24 bit latch for receiving a 24 bit word from said first latch every 2 milliseconds;
   c) a 27 bit latch, said latch being clocked by said reference signal;

d) a 27 bit binary full adder for receiving the output of said second latch;
e) said 27 bit latch being arranged to receive the output of said adder and to feed said output back to said adder so that said second 27 bit latch provides said 1.9485 MHz signal; and
f) means for dividing said 1.9485 MHz signal by 16.

* * * * *